Aug. 14, 1956     D. L. PETTIT     2,759,074
ELECTRIC CONTACT MOUNTING
Filed Oct. 16, 1952
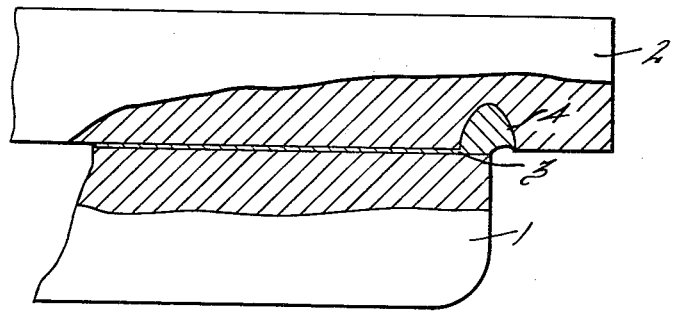
FIG. 1.
FIG. 2.
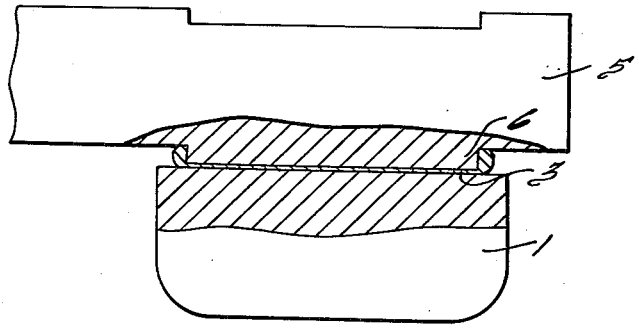
FIG. 3.
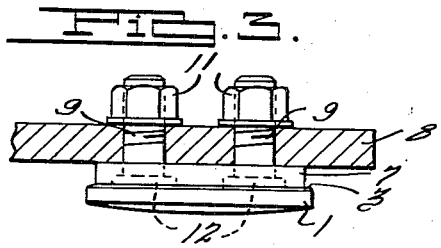
INVENTOR.
Dorn L. Pettit.
BY Myron J. Seibold
ATTORNEY.

United States Patent Office 2,759,074
Patented Aug. 14, 1956

2,759,074
ELECTRIC CONTACT MOUNTING

Dorn L. Pettit, Milwaukee, Wis., assignor to Square D Company, Detroit, Mich., a corporation of Michigan Application October 16, 1952, Serial No. 315,137

4 Claims. (Cl. 200—166)

This invention relates to an electric contact mounting and has for its object the provision of a brazed contact mounting in which contamination of the side surfaces of the contact with the brazing material is avoided.

Other objects and features of the invention will be readily apparent to those skilled in the art from the specification and appended drawings illustrating certain preferred embodiments in which:

Figure 1 is a partial sectional view showing one form of contact mounting in accordance with the present invention.

Figure 2 is a view similar to Figure 1, but showing a modified form of contact mounting.

Figure 3 is a partial sectional view showing a further modified contact mounting according to the present invention.

In Figure 1 of the drawing, there is shown an electric contact 1 mounted upon a backing material such as a conducting contact finger 2 through the medium of a brazing material 3. The backing material shown as contact finger 2 is formed of any conventional switch conducting material such as copper, brass, bronze, etc., and is formed with a continuous groove 4 whose root dimension is substantially equal to and whose root shape corresponds to the peripheral shape of the contact 1. The contact 1 may be formed of any conventional contact material such as fine silver, silver alloy, a sintered contact impregnated with silver, or a silver base contact formed by powdered metallurgy. The contact is mounted on the attachment face of the backing 2 with the side surfaces aligned with the root of the groove 4 as shown in Figure 1 and with the brazing material 3 in thin strip form disposed between the contact and the backing surface, and this brazing material may be one of the conventional silver solders, such as Sil-fos. Upon the application of heat in the brazing operation, the brazing material 3 is melted and flows along the adjacent surfaces of the backing 2 and contact 1, excess brazing material flowing into groove 4 and leaving the side walls of the contact 1 clean and free from contamination by the brazing material.

In conventional practice, where the groove 4 is omitted from the contact mounting, the excess brazing material will, by molecular attraction, flow outwardly along the side surface of the contact 1 and if permitted to remain will, as the thickness of the contact is lost in switch operation, cause the cooperating contacts of the switch to stick together when the then operating face of the contact reaches the brazing material. To insure greater life of conventional contacts and to avoid the sticking above described, it is, in many cases, necessary to hollow mill around the contacts to eliminate the excess brazing material.

In Figure 2 the finger 5 is provided with a pressed out ledge 6 of a width less than the contact width and against whose surface the back of the contact 1 is mounted through the brazing material 3. In this construction, as in Figure 1, it will be noted that the peripheral edge of contact 1 is spaced from the finger 5 a greater distance than is the main portion of the back surface of the contact and again there is provided a groove at the periphery of the contact into which the excess brazing material can flow rather than on the side of the contact.

In the contact mounting of Figure 3, the contact 1 is mounted upon a backing 7 through the intermediary of the brazing material 3 and the backing 7 is rigidly mounted upon the finger 8 by means of a pair of studs 9 and 11. The studs 9 have small heads 12 countersunk in the attachment surface of the backing 7 and brazed therein by a separate operation prior to the brazing of the contact 1 thereto. For greater electrical conductivity, the surface of the backing 7 opposite the contact attaching surface may be silver plated. As in Figures 1 and 2, the width of the backing surface is less than the contact width.

While certain preferred embodiments of the invention have been specifically disclosed, it is understood that the invention is not limited thereto, as many variations will be readily apparent to those skilled in the art and the invention is to be given its broadest possible interpretation within the terms of the following claims:

What is claimed is:

1. An electric contact mounting comprising a contact arm, a solid backing of conducting material having a contact attachment surface, an opening through said backing having an enlarged portion at said contact attachment surface to provide a countersink, a headed stud extending through said opening with its head disposed in said countersink and extending beyond said backing at the side opposite to said countersink, an electric contact mounted on said backing by an attachment surface cooperating with said contact attachment surface, a brazing material interposed between and adhering to said surfaces to effect the mounting, and said backing being fixed to said contact arm by means of said stud.

2. An electric contact mounting comprising a contact arm, a solid backing of conducting material having a contact attachment surface, an opening through said backing having an enlarged portion at said contact attachment surface to provide a countersink, a headed stud extending through said opening with its head disposed in said countersink and extending beyond said backing at the side opposite to said countersink, an electric contact mounted on said backing by an attachment surface cooperating with said contact attachment surface, and a brazing material interposed between and adhering to said surfaces to effect said mounting, said backing being fixed to said contact arm by means of said stud, and the attachment surface of said backing being narrower than the attachment surface of said contact and said backing being spaced from said contact at the periphery thereof whereby to inhibit flow of excess brazing material onto the side wall of said contact.

3. An electric contact mounting comprising a contact arm, a solid backing of conducting material having a contact attachment surface, an opening through said backing having an enlarged portion at said contact attachment surface to provide a countersink, a headed stud extending through said opening with its head disposed in said countersink and extending beyond said backing at the side opposite to said countersink, a brazing material rigidly mounting said stud in said backing, an electric contact mounted on said backing by an attachment surface cooperating with said contact attachment surface, a brazing material interposed between and adhering to said surfaces to effect the mounting, and said backing being fixed to said contact arm by means of said stud.

4. An electric contact mounting comprising a contact arm, a solid backing of conducting material having a contact attachment surface, a pair of openings through said backing, said openings being enlarged at said contact surface to provide countersinks, a pair of headed studs extending through said openings with their heads disposed in said countersinks and extending beyond said backing at the side opposite to said countersinks, means mounting said studs rigidly in said backing, an electric contact mounted on said backing by an attachment surface cooperating with said contact attachment surface, a brazing material interposed between and adhering to said surfaces to effect said mounting, said backing being fixed to said contact arm by means of said studs, the attachment surface of said backing being narrower than the attachment surface of said contact, and said backing being spaced from said contact at the periphery thereof whereby to inhibit flow of excess brazing material onto the walls of said contact.

References Cited in the file of this patent

UNITED STATES PATENTS

| | | |
|---|---|---|
| 1,181,742 | Coolidge | May 2, 1916 |
| 2,347,815 | Ebert | May 2, 1944 |
| 2,406,327 | Friedrich | Aug. 27, 1946 |
| 2,575,808 | Halverson et al. | Nov. 20, 1951 |